United States Patent
Hoppe-Hoeffler et al.

[11] Patent Number: 5,430,078
[45] Date of Patent: Jul. 4, 1995

[54] ELECTRODEPOSITION COATING COMPOSITION COMPRISING CELLULOSE ADDITIVE

[75] Inventors: Monika Hoppe-Hoeffler, Senden, Germany; Linda K. Borton, Rochester Hills; Charles L. Tazzia, Grosse Pointe, both of Mich.

[73] Assignee: BASF Corporation, Southfield, Mich.

[21] Appl. No.: 114,702

[22] Filed: Aug. 31, 1993

[51] Int. Cl.$^6$ .......................... C08K 3/20; C08L 63/01
[52] U.S. Cl. .................... 523/414; 204/181.4; 204/181.7; 524/44; 524/45; 524/46; 524/901
[58] Field of Search .............. 523/414; 204/181.4, 204/181.7; 524/44, 45, 46, 901

[56] References Cited

U.S. PATENT DOCUMENTS

| | | | |
|---|---|---|---|
| 4,089,828 | 5/1978 | Vasishth et al. | 523/410 |
| 4,833,208 | 5/1989 | Miyazono et al. | 267/285 |
| 4,851,460 | 7/1989 | Stranghöner et al. | 523/415 |
| 4,975,475 | 12/1990 | Tsuchiya et al. | 523/411 |
| 5,066,689 | 11/1991 | Patzschke et al. | 523/415 |
| 5,070,120 | 12/1991 | Sakamoto et al. | 523/412 |

OTHER PUBLICATIONS

Grant et al., Grant & Hackh's Chemical Dictionary, 1969, p. 477.

*Primary Examiner*—Melvyn I. Marquis
*Assistant Examiner*—D. Aylward
*Attorney, Agent, or Firm*—Anne Gerry Sabourin

[57] ABSTRACT

An electrodeposition coating composition is described comprising:
(a) an aqueous dispersion of a water-dispersible, electrically-depositable resin, and
(b) a water-soluble cellulose ether.

10 Claims, No Drawings

ELECTRODEPOSITION COATING COMPOSITION COMPRISING CELLULOSE ADDITIVE

FIELD OF THE INVENTION

This invention relates to electrodeposition coating compositions.

BACKGROUND OF THE INVENTION

Electrodeposition coating, or electrocoating, is widely used in the art for the application of polymer coatings to metal substrates. Electrodeposition baths usually comprise a principal film-forming resin, such as an acrylic or epoxy resin, with ionic groups that can be salted so that the resin can be dispersed or dissolved in an aqueous bath. Pigments (dispersed in resin pastes), dyes, flow control agents, and other additives are often included in the electrocoat bath.

For automotive or industrial applications where hard electrocoat films are desired, the bath also includes a blocked crosslinking agent that unblocks under appropriate conditions (e.g., with the application of heat) to react with functional groups on the principal resin and thus cure the coating.

One of the advantages of electrodeposition coating compositions and processes is that the coating composition can be applied to a variety of metallic substrates regardless of shape or configuration. This is especially advantageous when the coating is applied as an anticorrosive coating onto a substrate having a number of irregular surfaces, such as a motor vehicle body. In order to maximize an electrodeposition coating's anticorrosion effectiveness, it is important that the coating form a contiguous layer over all portions of the metallic substrate.

Two criteria for measuring the effectiveness of an electrodeposition coating for covering all portions of the substrate are throwpower and edge coverage. Throwpower measures the effectiveness of an electrodeposition coating at covering recessed or interior areas of a metal substrate. Edge coverage measures the effectiveness of an electrodeposition coating at covering the edges of a metallic substrate. Good throwpower and edge coverage are important in order to maximize an electrodeposition coating's anticorrosion effectiveness.

Electrodeposition coatings must often satisfy a number of other criteria as well. A high degree of smoothness is often desirable. For example, when the electrodeposition coating serves as a primer for a high-gloss topcoat, the primer layer must be very smooth in order for the topcoat to have a satisfactory appearance. It is also advantageous to exhibit stability over a range of pH.

It is therefore desirable to provide an electrodeposition coating composition that provides good throwpower and edge coverage, without compromising overall corrosion protection and smoothness.

SUMMARY OF THE INVENTION

According to the present invention, there is provided an electrodeposition coating composition comprising:
(a) an aqueous dispersion of a water-dispersible, electrically-depositable resin, and
(b) a water-soluble cellulose ether.

When used in an electrodeposition process, the coating composition of the invention provides a contiguous coating over a variety of portions of the metal substrate, including recessed areas and edges. The coating composition is thus highly effective as an anticorrosive primer coating for metal substrates, particularly for motor vehicle bodies.

DESCRIPTION OF THE PREFERRED EMBODIMENTS

Water-soluble cellulose ether materials are well-known in the art. Water solubility is imparted to the cellulose by the incorporation of water-solubilizing groups such as hydroxyl or carboxyl groups. Commercially-available water-soluble cellulose ethers include, for example, hydroxyethyl cellulose, carboxymethyl cellulose, carboxymethylhydroxyethyl cellulose, hydroxymethyl cellulose, and carboxyethyl cellulose. In a preferred embodiment of the invention, the water-soluble cellulose ether is hydroxyethyl cellulose.

In a preferred embodiment of the invention, the substituent groups and/or substitution pattern on the water-soluble cellulose ether is such that it imparts resistance to microbial attack. Water-soluble cellulose ethers having resistance to microbial attack include those described in U.S. Pat. Nos. 4,009,329 and 4,084,060, the disclosures of which are incorporated herein by reference.

Water-soluble cellulose ethers such as hydroxyethyl cellulose are typically supplied in varying viscosity grades. The viscosities of solutions will vary widely depending on the concentration and shear rate to which the solution is exposed. High viscosity grade cellulose ethers are non-Newtonian, exhibiting a high degree of pseudoplasticity. For example, a 2% solution of a high viscosity grade hydroxyethyl cellulose can exhibit a viscosity of from around 100 cp at a shear rate of 10,000 sec$^{-1}$ and viscosities of 100,000 or more at a shear rate of 0.1 sec$^{-1}$. Low viscosity grade cellulose ethers are nearly Newtonian, exhibiting a low degree of pseudoplasticity. Non-Newtonian cellulose ethers, such as Cellosize® QP-100MH, Cellosize® QP-52000H, and Cellosize® QP-30000H, all available from Union Carbide, are preferred in the practice of the present invention.

The viscosity of the water-soluble cellulose used in the present invention is preferably between 10,000 cPoise and 300,000 cPoise (at a concentration of 2% and a temperature of 25° C.), and more preferably between 60,000 and 100,000. The preferred viscosity for a 1% solution at 20° C. under a shear rate of 30 min$^{-1}$ is from 500 cPoise and 12,000 cPoise, and more preferably from 1000 cPoise and 10,000 cPoise.

The water-soluble cellulose ether is incorporated into an electrodeposition coating bath. The water-soluble cellulose ether is useful in the bath at levels of 0.001% to 10%, and preferably 0.05% to 2%, as a weight percentage of the principal resin nonvolatiles in the electrocoat bath.

The present invention is useful with essentially any electrodeposition coating composition. Water-dispersible resins usable in the electrodeposition coating process may be classified, depending upon their dispersed state, into the solution type, the dispersion type, the emulsion type, and the suspension type. These types of resins are collectively referred to as "water-dispersible resins" herein. A wide variety of such resins are known and may be used in this invention.

A variety of such anionic or cationic resins are known including acrylic, polyester, polyether, phenolic, epoxy, polyurethane, polyamide, polybutadiene, and oil based resins. The resins are typically rendered water-soluble or dispersible through the incorporation of one or more cationic or anionic groups. Typical examples thereof are acrylic copolymers containing acrylic or methacrylic acid, maleinized natural and synthetic drying oils, maleinized polybutadiene, half esters and half amides of maleinized oils and polymers.

In one preferred embodiment of the invention, the electrodepositable resin is a cationic resin for use in cathodic electrodeposition processes such as those used in the automotive industry. Water-dispersible resins used in the cathodic electrodeposition coating process have a cationic functional group such as primary, secondary or tertiary amine moiety as a positively chargeable hydrophilic group. A variety of such resins are known including epoxy, polyether, polyester, polyurethane, polyamide, polybutadiene, phenolic and acrylic resins.

Cationic resins have been described in great number in the literature. They typically contain a number of basic groups, such as primary, secondary or tertiary amino groups, so as to provide dispersibility with water. If these resins contain primary and/or secondary amine groups, then they may or may not also contain hydroxyl groups and preferably they do. If only tertiary amino groups are present in the cationic resin, then the resin must contain hydroxyl or other functional groups in order to enable cross-linking. The amino equivalent weight of the cationic resin can range from 150 to 3000, and preferably 500 to 2000. The hydroxyl equivalent weight of the resins, if they have OH groups, is generally between 150 and 1000, and preferably 200 to 500. In addition, the resins may contain C=C double bonds, the C=C equivalent weight preferably being 500 to 1500.

Water-dispersible resins used in the anodic electrodeposition coating process must have an anionic functional group such as carboxyl group for imparting the resin with negative charges and for rendering the resin hydrophilic.

The molecular weight (mean weight) of a typical electrodepositable resin is usually in the range from 300 to 50,000, and preferably 5000 to 20,000.

Examples of cationic resins are described in the Journal of Coatings Technology, Vol. 54, No. 686, (1982), p. 33–41 ("Polymer Compositions for Cationic Electrodepositable Coatings"), the disclosure of which is incorporated by reference. Polymers of alpha, beta-olefinically unsaturated monomers that contain hydroxyl and/or amino groups may be mentioned here. The hydroxyl or amino groups may be introduced using appropriate monomers in the copolymerization, for example by means of hydroxyl or amino esters of alpha, beta-olefinically unsaturated carboxylic acids, such as hydroxyalkyl (meth)acrylates or aminoalkyl (meth)acrylates, or by polymer analogous reaction with diamines or polyamines, for example with N,N-dimethylaminopropylamine, with formation of amide, amino or urethane groups. The polyaminopolyamides, which can be obtained from dimerized fatty acids and polyamines, are a further group. Aminopolyether polyols, which can be prepared by reaction of primary or secondary amines with a polyglycidyl ether, are particularly suited for this. Sufficient epoxide groups to convert all amino groups into tertiary amino groups are advantageously present here. The preferred polyglycidyl ethers are polyglycidyl ethers of bisphenol A and similar polyphenols. They can be prepared, for example by etherifying a polyphenol using an epihalohydrin, such as epichlorohydrin, in the presence of alkali.

The polyglycidyl ethers of the polyphenols may be reacted as such with the amines, but it is frequently advantageous to react some of the reactive epoxide groups with a modified material in order to improve the film properties. The reaction of the epoxide groups with a polyol or a polycarboxylic acid is particularly preferred.

Useful polyols can include polyether polyols, polyester polyols, or urethane polyols. Polyether polyols can be prepared by addition polymerization of alkylene oxides (for example ethylene oxide, propylene oxide, tetrahydrofuran) with low-molecular-weight polyols having 2 to 8 carbon atoms and a molecular weight of about 50 to 300 (for example ethylene glycol, diethylene glycol, propylene glycol, dipropylene glycols, glycerol, trimethylolpropane, 1,2,6-hexanetriol, pentaerythrite). If ethylene oxide is used alone or in combination with other alkylene oxides as alkylene oxide components, the water-solubility of the resin is improved.

Polyester polyols can be prepared by reaction of the above mentioned low-molecular weight polyols or epoxy compounds, for example fatty acid glycidyl esters, with polycarboxylic acid (for example adipic acid, succinic acid, maleic acid, phthalic acid, or terephthalic acid), or derivatives thereof.

Polyester polyols can be prepared by ring-opening polymerization of a cyclic ester, such as caprolactone or butyrolactone.

Urethane-modified polyols can be obtained by reaction of an excess of the above-mentioned polyether polyols or polyester polyols with an organic polyisocyanate.

The above-mentioned polycarboxylic acids are obtained by reaction of the polyols described above with an excess of polycarboxylic acids or, preferably, the anhydrides thereof. They can likewise be obtained by esterification of polycarboxylic acids, or anhydrides thereof, using low-molecular weight polyols, such as ethylene glycol, propylene glycol, etc. Low-molecular weight polyether polyamines or polyamines, such as, for example, hexamethylenediamine, may also be employed in place of the low-molecular weight polyols.

The modification of the aminopolyether polyols using polyols or polycarboxylic acids is preferably carried out before the reaction of the polyglycidyl ethers with the primary or secondary amines. However, it is also possible to select the ratio of the polyglycidyl ether used as starting material to the amines in such a fashion that an excess of epoxy groups is present. The epoxy groups may then be reacted with the polycarboxylic acids or polyols. It is furthermore possible to further modify the final product, which no longer contains epoxide groups, by reaction of the hydroxyl groups with glycidyl ethers.

According to the curing mechanism of particular resins, they may be classified into three classes. The first one is those capable of self-crosslinking through a radical or oxidative polymerization reaction. The second class of resins requires a crosslinking agent such as blocked polyisocyanates. The third one utilizes both the self-crosslinking reaction and the crosslinking agent in combination.

According to the type of energy source required for initiating the crosslinking reaction, the water-dispersible, chargeable resins may also be classified into the ambient temperature curing or more preferably heat-curing.

The water-dispersible resins useful as principal resins in the present invention are typically hydrophilic such that they are not soluble or dispersible in water when they are in the form of a free base, but become soluble or dispersible to make a stable aqueous solution or dispersion when a sufficient amount (e.g., at least 20%, and more typically 50%) of the base function is neutralized. If the water-dispersible resins are too hydrophilic, they fail to form a coating film having satisfactory water- or corrosion resistance and/or the application of electrodeposition coating processes becomes difficult.

In order to enhance various film properties, the water-dispersible resins are often used in the form of an emulsion in which the water-dispersible resin constitutes a continuous phase, and an optional water-insoluble resin free from chargeable hydrophilic groups (e.g., an epoxy acrylate resin) constitutes a dispersed phase.

When the resin can be crosslinked with a crosslinking agent included in the coating composition for the electrocoat primer layer, any of a number of crosslinking agents or curing agents may be used. Commonly-used crosslinking agents include blocked polyisocyanates including isocyanurates of polyisocyanates (e.g., hexamethylene diisocyanate) and transesterification crosslinking agents.

In a preferred embodiment of the invention, the crosslinking agent is an aromatic polyisocyanate, including isocyanurates of aromatic polyisocyanates. Useful aromatic polyisocyanates include toluene diisocyanate (TDI), methylene diphenyl diisocyanate (MDI), tetramethylxylene diisocyanate, and the like. In another preferred embodiment, an isocyanurate of an aliphatic polyisocyanate such as hexamethylene diisocyanate is used. These isocyanates are pre-reacted with a blocking agent such an oxime, an alcohol, or an amine, which blocks the isocyanate crosslinking functionality. Upon heating, the blocking agents separate and crosslinking occurs.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 5 to 40 percent by weight resin solids. Aqueous resin concentrates which are to be further diluted with water, generally range from 10 to 30 percent by total weight solids.

The above components are uniformly dispersed in an aqueous medium containing a base in case of the anodic electrodeposition or an acid in case of the cathodic electrodeposition in an amount sufficient to neutralize enough of the ionic groups to impart water-dispersibility to the resin. Examples of bases include ammonia, diethanolamine, triethanolamine, methylethanolamine, diethylamine, morpholine, and potassium hydroxide. Examples of acids include phosphoric acid, acetic acid, propionic acid and lactic acid.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene, glycolethylcellosolve, propylcellosolve, butylcellosolve, ethyleneglycol dimethyl ether, or diacetone alcohol. A small amount of a water-immiscible organic solvent such as xylene, toluene, methyl isobutyl ketone or 2-ethylhexanol may be added to the mixture of water and the water-miscible organic solvent. The amount of coalescing solvent is not unduly critical and is generally between about 0 to 15 percent by weight, preferably about 0.5 to 5 percent by weight based on total weight of the resin solids.

The electrodeposition coating composition used in this invention may further contain conventional pigments such as titanium dioxide, ferric oxide, carbon black, aluminum silicate, precipitated barium sulfate, aluminum phosphomolybdate, strontium chromate, basic lead silicate or lead chromate. The pigment-to-resin weight ratio can be important and should be preferably less than 50:100, more preferably less than 40:100, and usually about 20 to 40:100. Higher pigment-to-resin solids weight ratios have also been found to adversely affect coalescence and flow.

The electrodeposition coating compositions used in the invention can contain optional ingredients such as wetting agents, surfactants, UV absorbers, HALS compounds, antioxidants, defoamers and so forth. Examples of surfactants and wetting agents include alkyl imidazolines such as those available from Ciba-Geigy Industrial Chemicals as Amine C ®, acetylenic alcohols available from Air Products and Chemicals as Surfynol ® 104. In a preferred embodiment, the electrodeposition coating composition includes a biocide to help protect the water-soluble cellulose ether from microbial attack. Such biocides are well-known in the art and include, for example, Kathon ® EDS, Troxsan ® 186, and Nalco ® 7320.

These optional ingredients, when present, constitute from about 0 to 20 percent by weight of resin solids. Plasticizers are optional ingredients because they promote flow. Examples are high boiling water immiscible materials such as ethylene or propylene oxide adducts of nonyl phenols or bisphenol A. Plasticizers can be used and if so are usually used at levels of about 0 to 15 percent by weight resin solids.

Curing catalysts such as tin catalysts are usually present in the coating composition. Examples are dibutyltin dilaurate and dibutyltin oxide. When used, they are typically present in amounts of about 0.05 to 2 percent by weight tin based on weight of total resin solids.

In general, sufficient water is added so that the dispersion has a solids content of more than 20, preferably more than 30% by weight.

The electrodeposition coating composition used in this invention may be applied on a conductive substrate by the electrodeposition coating process at a nonvolatile content of 10 to 25% by weight to a dry film thickness of 10 to 35 μm. After application, the coating may be cured at ambient or an elevated temperature, depending upon the nature of particular base resins.

The electrodeposition of the coating preparations according to the invention may be carried out by any of a number of processes known to those skilled in the art. The deposition may be carried out on all electrically conducting substrates, for example metal, such as steel, copper, aluminum and the like.

According to the invention, a pigmented resin coating and optionally a clearcoat layer is applied over the electrocoat primer layer. In automotive applications, the pigmented resin layer is often called a basecoat or pigmented basecoat. The resin in the pigmented resin layer can be of a number of resins known in the art. For example, the resin can be an acrylic, a polyurethane, or a polyester. Typical pigmented resin coating formulations are described in U.S. Pat. Nos. 4,791,168, 4,414,357, and 4,546,046. The pigmented resin can be cured by any of the known mechanisms and curing agents, such as a melamine polyol reaction (e.g., melamine cure of a hydroxy-functional acrylic resin).

The invention is further described in the following examples.

EXAMPLE 1

Preparation A—Grind Resin 27.81 parts of the diglycidyl ether of bisphenol A and 1.44 parts of xylene were charged into a reaction vessel. The charge was heated to 82° C. under a dry nitrogen atmosphere. Next, the heating of the reaction vessel was discontinued and a charge of 5.81 parts bisphenol A was added. The heating of the reaction vessel was then continued to a temperature of 127° C. At this time, the reaction exothermed on its own, with a peak of about 149° C.–160° C. The mixture was held above 149° C. until a EEW (epoxide equivalent weight) of 350±10 was achieved.

Once the EEW of 350 was achieved, 21.08 parts ethylene glycol monobutyl ether was added to the reaction vessel and the bath was then cooled to 90° C.

After a temperature of 90° C. was achieved, a mixture of 7.77 parts of polyglycolamine and 4.07 parts dimethylaminopropylamine were added to the reaction vessel over a period of 6 minutes. The batch exothermed to 104° C.–110° C. and the exotherm was held at or below 115° C. for one hour. Next, 0.53 parts ethylene glycol monobutyl ether was added and thereafter 4.92 parts ethylene glycol monobutyl ether was charged into the reaction vessel and the batch was cooled to 77° C. Next, 14.9 parts nonylphenolglycidyl ether was charged into the reaction vessel. The batch exothermed to 88° C.–93° C., and the batch was held at this temperature for one hour.

Next, a pump of 1.53 parts ethylene glycol monobutyl ether was added and then 10.03 parts ethylene glycol monobutyl ether was charged into the reaction vessel and the batch was cooled to 66° C. The resultant product was then drummed off through 25 micron filter bags.

The nonvolatile content of the grind resin prepared in Example 1 was determined to be 60.0%, the weight per gallon was 8.53 and the viscosity was about 4900 centipoise at 25° C.

Preparation B—Pigment paste

| Component | Paste Formula Total Wt | NV Wt | Pig Wt | Bind Wt | % PS | % Total |
|---|---|---|---|---|---|---|
| Grind Resin | 198.3 | 119.0 | — | 119.0 | — | 19.83 |
| Acetic Acid | 11.1 | — | — | — | — | 1.11 |
| Defoamer (Tristar 27) | 7.0 | — | — | — | — | 0.70 |
| Carbon Black 1.26 | 12.6 | 12.6 | 12.6 | — | 3.0 | 1.26 |
| Low Silicate | 14.7 | 14.7 | 14.7 | — | 3.5 | 1.47 |
| (Basic White Low) | | | | | | |
| Clay Extender | 63.0 | 63.0 | 63.0 | — | 15.0 | 6.30 |
| Titanium Dioxide | 329.7 | 329.7 | 329.7 | — | 78.5 | 32.97 |
| Dibutylin Oxide (Fine Ground) | 21.0 | 21.0 | — | 21.0 | — | 2.10 |
| DI Water | 342.6 | — | — | — | — | 34.26 |
| Totals | 1000.0 | 560.0 | 420.0 | 140.0 | (100.0) | (100.0) |

Formulated For: 56.0% N.V. Before Reduction
Grind Resin Parameters 60.0% N.V.; 489 AEW Neutralization 75.0%

The grinding temperature was maintained in the range of 32° C.–46° C. All of the pastes ground to 8–10 μm in three passes through a vertical sand mill.

Preparation C—Principal Resin

Xylene was added to clean dry reactor. The mixing liquid was blanketed with pure N₂ and heated to 42° C.

Solid epoxy (characteristics and weight in Table below) was added at such a rate that the batch temperature never drops below 60° C., over a period of approximately two hours. Heating was continued until 100° C.

| Characteristics and Weight of Ingredients | |
|---|---|
| Weight | Ingredient |
| 81.1 | Xylene |
| 33.9 | Xylene |
| 568.1 | EPON ® 1001 (EEW = 530 +− 10) |
| 75.9 | Dodecyl phenol |
| 1.1 | BDMA |
| 42.1 | Ethylene glycol Monobutyl ether |
| 74.7 | Xylene |
| 42.6 | DEOA |
| 40.6 | Ethylene glycol monohexyl ether |
| 107.7 | Isobutanol |
| 13.3 | DAMPA |
| 1000.0 | Total Weight Principal Resin 70% N.V. |

At this point, the dodecyl phenol was added and then heated to 118° C. Vacuum drying by distillation of heating to 125° C. The pressure should be between 66 cm and 69 cm of Hg (88 kp-92 kp). The drying stage should take about one hour. Break vacuum with pure nitrogen only. The batch was cooled to 115° C. The sample at this point was % nonvolatiles (% N.V.)=95.0±0.5.

At 115° C., benzyldimethylamine (BDMA) was added. The peak exotherm temperature should reach 129°–132° C.±2° C. and the polymerization was followed by EEW (epoxide equivalent weight) titration. Every 30 minutes, the reaction was sampled and was stopped at an end point of 110±10 EEW. The typical reaction time was 3 hours.

At the target EEW, the reducing solvents were added followed by diethanol amine (DEOA).

The temperature of this reaction should not exceed 132° C. Cooling may be necessary at this point with jacket or coils. A vacuum suction was started immediately after the DEOA addition and pressure was reduced to 18 inches of Hg and held for 5 minutes. The pressure was further reduced in 2 inch Hg increments followed by short holding period until 26–27 inches of Hg was achieved. The batch was then cooled to 90° C. in one hour following addition of DEOA. To achieve this a good reflux rate should be attained in 20–25 minutes after the DEOA addition. All solvents were returned to the reactor.

After one hour of vacuum cooling, (T=90° C.), ethylene glycol monohexyl ether and isobutanol were added without breaking vacuum. The batch was cooled for 35 minutes to about 60° C. under full vacuum.

The dimethylamino propyl amine (DMAPA) was charged as fast as possible after the 35 minute cooling period. The batch temperature was kept below 63° C. The batch was kept between 54° C. and 60° C. for two hours after exotherm. Then it was heated 90° C. over one hour and this temperature held for one hour. The batch was cooled to 80° C.

Preparation D—Crosslinking Agent I

A blocked isocyanate cross-linking agent (polyurethane cross-linking agent) was prepared according to the following procedure. Slowly and with stirring in a nitrogen atmosphere 291 parts of an 80/20 isomeric mixture of 2,4,-/2,6-toluene diisocyanate, 0.08 parts of dibutyltin dilaurate and 180 parts of methyl iso-butyl ketone were added, the temperature being maintained below 38° C. The mixture was maintained at 38° C. for a further half hour after which 75 parts of trimethylolpropane were added. After allowing the reaction to proceed for about 10 hours, 175 parts of ethylene glycol monopropyl ether was added and the mixture reaction kept 1.5 hours at 121° C. until essentially all the isocyanate groups were reacted. This depletion was recognized from the infrared spectrum.

Another blocked isocyanate can be prepared by altering the foregoing order of addition pursuant to Example 1 of DE 2,701,002.

Preparation E—Cross-linking Agent II

A blocked isocyanate crosslinker (polyurea) was prepared according to the following procedure. Four-hundred-eighty-three parts of the triisocyanurate of hexamethylene diisocyanate and 193 parts of 2-hexanone were charged to a dry reactor. Diutylamine (307 parts) were added slowly and with stirring under nitrogen atmosphere so that the temperature does not exceed 80° C. After all amine has reacted 14 parts of n-butanol and 0.2 parts of dibutyltin dilaurate were added. The reaction mixture was heated to 80° C. until no isocyanate groups can be detected by infrared analysis.

Preparation F of Emulsion

With the foregoing principal resin stirring at 80° C. the acetic acid and plasticizer, Paraplex ® WP-I (sold by Rohm & Haas (are added, followed by addition of crosslinker I prepared as described above. The resin mixture at this point should be at about 56° C. It was mixed for 15 minutes.

Then, the resin premix and acid as formulated above were added with agitation to the H2O and Surfynol ® 104 (50% in ethylene glycol monobutyl ether) starting at 25° C. The nonvolatiles content was 55%. The temperature at this point was 37° C. to 40° C. The mix was stirred for the next portion of H2O. It is held and mixed 30 minutes. The temperature should be between 30° C. and 32° C. The remaining water was added. Final emulsion temperature was 27° C.-30° C.

| Emulsion Composition Table | |
|---|---|
| Weight | Ingredient |
| 302.0 | Principal Resin 70% N.V. |
| 28.3 | Plasticizer (nonylphenoxy polypropoxyethanol (100% N.V.) |
| 162.6 | Crosslinker I (70.0% N.V.) |
| 4.84 | Acetic Acid |
| 142.8 | H2O Portion I |
| 0.68 | Surfynol ® 104 (50%) in ethylene glycol monobutyl ether |
| 200.0 | H2O Portion II |
| 103.6 | H2O Portion III |

Preparation G—hydroxyethylcellulose solution 2 parts Cellosize ® QP 100M from Union Carbide is dissolved in 95 parts deionized water at ambient temperature.

Preparation H—Electrocoat bath 473 parts of the emulsion, 1 part lactic acid, 123.5 parts of the paste, 402.5 parts DI water and 20.9 parts of the hydroxyethylcellulose solution were combined at ambient temperature and stirred for about one hour. The bath solids were adjusted with DI water to yield a NV of about 21-24% by weight.

EXAMPLE 2

Preparation A—Grind resin

The grind resin was prepared as in Example 1.

Preparation B—Pigment Paste

| | Paste Formula | | | | | |
|---|---|---|---|---|---|---|
| Component | Total Wt | NV Wt | Pig Wt | Bind Wt | % PS | % Total |
| Grind Resin | 198.3 | 119.0 | — | 119.0 | — | 19.83 |
| Acetic Acid | 11.1 | — | — | — | — | 1.11 |
| Defoamer (Tristar 27) | 7.0 | — | — | — | — | 0.70 |
| Carbon Black 1.26 | 12.6 | 12.6 | 12.6 | — | 3.0 | 1.26 |
| Lead Silicate (Basic White Lead) | 14.7 | 14.7 | 14.7 | — | 3.5 | 1.47 |
| Clay Extender | 63.0 | 63.0 | 63.0 | — | 15.0 | 6.30 |
| Titanium Dioxide | 329.7 | 329.7 | 329.7 | — | 78.5 | 32.97 |
| Dibutylin Oxide (Fine Ground) | 21.0 | 21.0 | — | 21.0 | — | 2.10 |
| DI Water | 342.6 | — | — | — | — | 34.26 |
| Totals | 1000.0 | 560.0 | 420.0 | 140.0 | (100.0) | (100.0) |

Formulated For: 56.0% N.V. Before Reduction
Grind Resin Parameters 60.0% N.V.; 489 AEW Neutralization 75.0%

The grinding temperature was maintained in the range of 32° C.-46° C. All of the pastes ground to 8–10-μin three passes through a vertical sand mill.

Next, 328.5 parts of this paste were mixed with 55.6 parts of the hydroxyethylcellulose solution at ambient temperature for about 1 hour.

Preparation C—Principal Resin

The principal resin was prepared as in Example 1.

Preparation D—Crosslinking Agent I

The crosslinking agent I was prepared as in Example 1.

Preparation E—Crosslinking Agent II

The crosslinking agent II was prepared as in Example 1.

Preparation F—Emulsion

The emulsion was prepared as in Example 1.

Preparation G—Hydroxyethylcellulose solution

The hydroxyethylcellulose solution was prepared as in Example 1.

Preparation H—Electrocoat bath

The electrocoat bath was prepared as in Example 1.

EXAMPLE 3

The procedure for example 3 was identical to Example 2, but Cellosize® HEC 52000 was used instead of Cellosize® QP 100M.

Evaluation Procedure

The electrodip paints of Examples 1-3 were left to age with stirring for 5 days at room temperature. The deposition of the paint films takes place over 2 min at the given voltage onto cathodically connected steel test panels.

| Deposition Behavior | film build | rupture |
| --- | --- | --- |
| no Cellosize ® | 270V | 320 V |
| Example 1 | 250V | 300 V |
| Example 2 | 250V | 300 V |
| Example 3 | 250V | 320 V |

The bath temperature in this procedure was held at 27° C. The wet films deposited were rinsed with deionized water and baked for 20 min at 175° C. The resulting paint films were tested and the test results are collated in the following table:

| Tests | Electrocoating Paints | | | |
| --- | --- | --- | --- | --- |
| 20 Cycles SCAB on phosphated steel | no Cellosize ® | Ex. 1 | Ex. 2 | Ex. 3 |
| Edge corrosion[1] | 4 | 0 | 0 | 1 |
| Edge Creep (mm) | 1.37 | 0 | 0 | 0.34 |

| Tests | Electrocoating Paints | | | |
| --- | --- | --- | --- | --- |
| 20 Cycles SCAB on phosphated steel | no Cellosize ® | Ex. 1 | Ex. 2 | Ex. 3 |
| Electrical Quality[2] (%) | 32 | 100 | 100 | 98 |

[1] 0 = best value, 5 = worst value
[2] This figure is obtained by applying a voltage of 50–1000 V to the coated edge and determining the insulation effect to electric current. The higher the electrical quality, the higher the insulation effect. The higher the insulation effect, the better the edge is coated by an electrodip paint film.

The invention has been described in detail with reference to preferred embodiments thereof. It should be understood, however, that variations and modifications can be made within the spirit and scope of the invention.

What is claimed is:

1. An electrodeposition coating composition comprising:
   (a) an aqueous dispersion of a water-dispersible, electrically-depositable resin, and
   (b) a water-soluble cellulose ether, wherein the addition of the water-soluble cellulose ether results in improved edge coverage.

2. An electrodeposition coating composition according to claim 1 wherein the water-soluble cellulose ether is hydroxyethyl cellulose.

3. An electrodeposition coating composition according to claim 1 wherein the water-soluble cellulose ether is carboxymethyl cellulose.

4. An electrodeposition coating composition according to claim 1 wherein the water-soluble cellulose ether has a viscosity, if in an aqueous solution at 25° C. at a concentration of 2% by weight, of 10,000 cPoise to 300,000 cPoise.

5. An electrodeposition coating composition according to claim 4 wherein the water-soluble cellulose ether also has a viscosity, if in an aqueous solution at 25° C. at a concentration of 1% by weight subjected to a shear rate of 30 min$^{-1}$, of 500 cPoise to 12,000 cPoise.

6. An electrodeposition coating composition according to claim 1 wherein the water-soluble cellulose ether has a viscosity, if in an aqueous solution at 25° C. at a concentration of 1% by weight subjected to a shear rate of 30 min$^{-1}$, of 500 cPoise to 12,000 cPoise.

7. An electrodeposition coating composition according to claim 1 comprising from 0,001 to 10 percent by weight of said water-soluble cellulose ether, based on the on the solids weight of said resin (a).

8. An electrodeposition coating composition according to claim 5 comprising from 0.05 to 2 percent by weight of said water-soluble cellulose ether, based on the solids weight of said resin (a).

9. An electrodeposition coating composition according to claim 1, further comprising a biocide additive.

10. An electrodeposition coating composition according claim 1 wherein said water-soluble cellulose ether has substituent groups and/or a substitution pattern that imparts resistance to microbial attack.

* * * * *